Nov. 7, 1967 W. BONGENAAR 3,351,772
MAGNETIC CORE SWITCH
Filed Oct. 7, 1963
2 Sheets-Sheet 1

INVENTOR.
WILLEM BONGENAAR.
BY
Frank R. Trifari
AGENT

| n | $4^n$ | LS | IC | |
|---|---|---|---|---|
| | | | $2^{n-1}$ | $1/2^n$ |
| 1 | 4 | 2 | 1 | 1/2 |
| 2 | 16 | 8 | 2 | 1/4 |
| 3 | 64 | 32 | 4 | 1/8 |
| 4 | 256 | 128 | 8 | 1/16 |
| 5 | 1024 | 512 | 16 | 1/32 |

INVENTOR
WILLEM BONGENAAR.
BY Frank R. Jufari
AGENT

United States Patent Office 3,351,772
Patented Nov. 7, 1967

3,351,772

MAGNETIC CORE SWITCH

Willem Bongenaar, Emmasingel, Eindhoven, Netherlands, assignor to North American Philips Company, Inc., New York, N.Y., a corporation of Delaware Filed Oct. 7, 1963, Ser. No. 314,208
Claims priority, application Netherlands, Oct. 18, 1962, 284,496
2 Claims. (Cl. 307—88)

ABSTRACT OF THE DISCLOSURE

The disclosure describes switching core assemblies for producing switching currents of either polarity comprising a plurality of cores each energized by a plurality of windings. The number of windings through each core is equal to one plus the smallest even power of 2 which is equal to or larger than the number of cores. By energizing one of the windings as a compensating winding and by the selective energization of the remaining windings a selected core is actuated and the energization current is shared by a plurality of windings.

Figure 1:
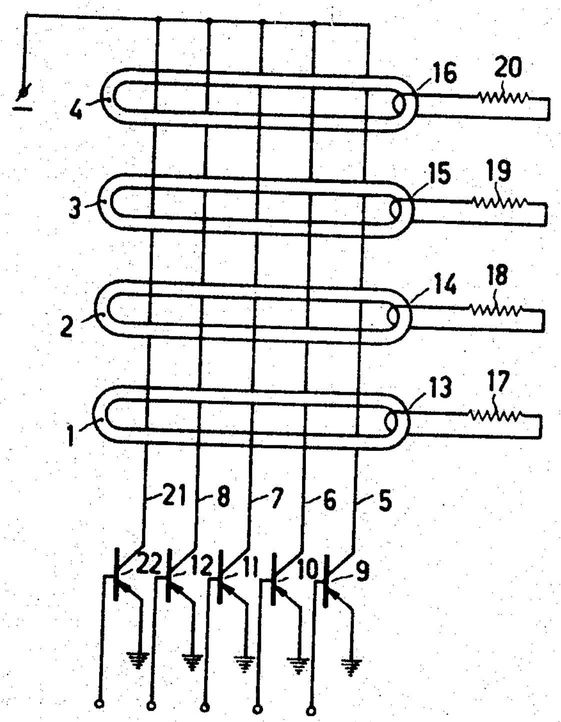

The invention relates to a magnetic core switch comprising a number of magnetic cores and energizing windings provided on the magnetic cores. Each energizing winding on a magnetic core is arranged in series with an energizing winding of each other magnetic core and the series arrangements of energizing windings are connected to energizing devices for supplying current to a few selected series arrangements of energizing windings. The magnetic effects of the currents flowing through the selected energizing windings compensate one another in all the magnetic cores, with the exception of the one selected core.

Such magnetic core switches, in which a plurality of windings cooperate to supply the energizing current and thereby share the load, are advantageously used in fast magnetic core memories for producing the required short duration reading and writing pulses of greater power and of equal amplitude and of opposite polarities nothwithstanding the fact that the input energizing devices or drivers, may be of small power and one polarity. In digital computers, in which such magnetic core switches are used for controlling magnetic core memories, the binary code is used substantially exclusively for addressing the memory places, so that the number of addresses always is a power of 2. In such a machine, each core of the switch corresponds to a binary address and conversely each possible binary address corresponds to a magnetic core, so that the number of cores will always be a power of 2.

Magnetic core switches have already been proposed in which the number of windings on each core is twice larger than the smallest power of 2 which is equal to or larger than the number of cores, so that, for example, for 16 cores the number of windings on a core is equal to 32.

In addition core switches have been proposed in which the number of windings on each core is equal to the smallest multiple of 4 which is larger than the number of cores, so that, for example, for 16 magnetic cores the number of windings is equal to 20.

The object of the invention is to provide a new construction of the magnetic core switch described, which makes it possible to reduce the number of energizing windings while maintaining the advantages of load sharing.

The magnetic core switch according to the invention is characterized in that the number of energizing windings on each magnetic core is one larger than the smallest even power of 2 which is equal to or larger than the number of magnetic cores. In addition, each time that energizing currents are supplied to a selected number of windings a compensation current is also supplied to a series arrangement of auxiliary windings. This serves for compensating the magnetic effect of the energizing currents of all magnetic cores with the exception of one selected magnet core.

By doubling the number of energizing windings on each core and their drivers—with the exception of the auxiliary winding used for compensation—there is produced a magnetic core switch in which the number of drive windings is equal to twice the number of cores. Such a switch is already known in the prior art. By combining two such core switches by connecting their respective drive windings in series, and also adding an auxiliary winding, a switch is provided in which the number of cores is equal to an odd power of 2 and in which the number of energizing windings on a core is maximally one larger than the number of cores. Consequently, the invention also relates to a core switch which is characterized in that the number of windings of each core is one larger than twice the smallest even power of 2 which is equal to or larger than the number of cores.

Figure 2:
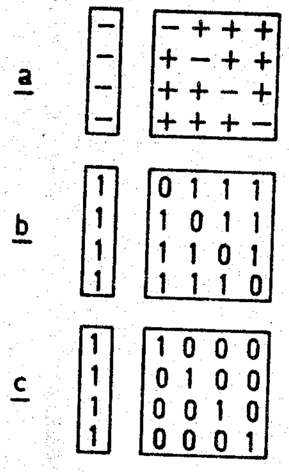
Figures 3, 4:
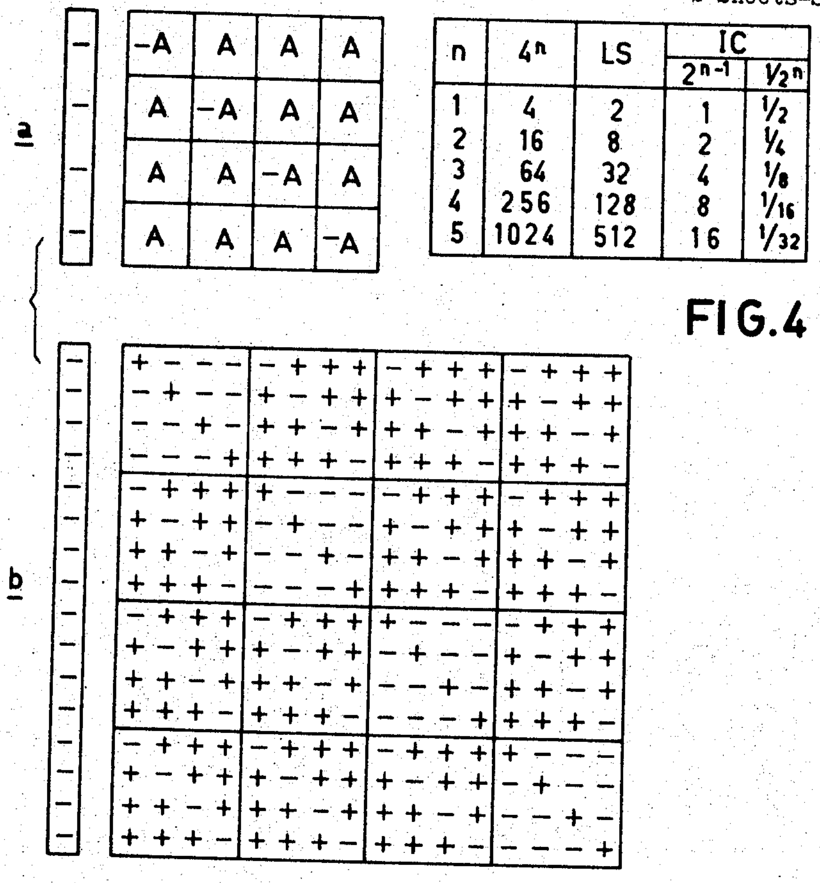

In order that the invention may readily be carried into effect, it will now be described more fully, by way of example, with reference to the accompanying drawings, in which FIGURE 1 shows an example of a magnetic core switch according to the invention, FIGURE 2 shows a few diagrams for illustrating the operation of the magnetic core switch shown in FIGURE 1, FIGURE 3*a* showns a development diagram for realizing magnetic core switches with $4^n$ magnet cores, FIGURE 3*b* shows the winding diagram for $n=2$, FIGURE 4 shows a table in which the load distribution factor LS and the compensation current IC are shown for various numbers of magnetic cores, FIGURE 5*a* shows a development diagram for realizing magnetic core switches with $2.4^n$ magnetic cores, FIGURE 5*b* shows the winding diagram for $n=1$.

The magnetic core switch shown in FIGURE 1 comprises four switching cores 1–4 of magnetic material which are each coupled to four energizing winding 5–8 which are connected between a negative terminal of a battery not shown and the collector electrodes of the transistors 9–12, the emitter electrodes of which as well as the positive terminal of the battery being connected to earth. On the cores the output windings 13–16 are provided which are each connected to a row or column conductor of a magnetic core memory, which row or column conductors form loads for the cores as shown in FIGURE 1 by the impedances 17–20. In addition, an auxiliary winding 21 is provided on the cores which has a function deviating from that of windings 5–8 and which is connected between the negative terminal of the battery and the collector electrode of the transistor 22 of which the emitter electrode is connected to earth. The winding 21 is hereinafter termed compensation winding to indicate the function of this winding.

When using the core switch shown in FIGURE 1, energizing currents are supplied to a selected number of the windings 5–8, by driving the corresponding transistors 7–21. Simultaneously, a compensation current is supplied to the winding 21 by driving the transistor 22, this winding thereby compensating the magnetic effect of the energizing currents of the cores not selected. As a consequence a selected magnetic core is excited in the positive or the negative direction depending upon the selection of the energizing winding N and none of the other cores is energized. Furthermore, the load connected to the selected magnetic core is distributed between a number of energizing devices, in this case transistors.

With positive or negative excitation respectively, the selected magnetic core supplies a positive or negative load current respectively in the output winding which current fulfills the function of writing or reading current respectively in the row or column conductor connected to the output winding. A positive excitation is assumed to bring about an actuation in the writing direction and a negative energization an actuation in the reading direction.

The described operation of the magnetic core switch shown in FIGURE 1 is realized by choosing the winding sense of the energizing windings of the cores in accordance with the winding diagram shown in FIGURE 2*a*. In this winding diagram, each row corresponds to a magnetic core and each column corresponds to an energizing winding of which the winding sense on a given core is indicated by a + or — sign at the intersection of the row or column in question. In FIGURE 1 a winding sense is termed positive if the winding extends above the lower limb of the core and below the upper limb and the winding sense is termed negative if the winding extends below the lower limb and above the upper limb of the core. A comparison between FIGURES 1 and 2*a* shows that the windings are provided on the cores in accordance with this diagram. The separate column on the left of the winding diagram corresponds to the compensation winding 21 which has a negative winding sense on each core.

To excite a given core in the writing direction, energizing currents are supplied only to those windings of the core having a positive winding sense and a compensation current is also supplied to the compensation winding 21. In the diagram of FIGURE 2*b* it is shown which transistors must be driven to energize a given core in the writing direction. In this diagram, which is also termed writing diagram, each row corresponds to a core and each column corresponds to a transistor. The numeral 1 indicates the transistors which are driven and 0 indicates the non-driven transistors for writing into each core. The writing diagram can immediately be derived from the winding diagram shown in FIGURE 2*a* by replacing therein every + by a 1 and every — by a 0. The separate column on the left of FIGURE 2*b* corresponds to the transistor 22 and indicates that this is driven each time. FIGURE 2*c* shows a corresponding reading diagram which indicates which transistors must be driven for exciting the respective cores in the reading direction. The reading diagram can immediately be derived from the winding diagram shown in FIGURE 2*a* by replacing therein every + by a 0 and every — by a 1. The separate column on the left of FIGURE 2*c* again corresponds to transistor 22 and indicates that this transistor is driven each time.

The magnetic effect of the compensation current through the compensation winding 21 has a value equal to the magnetic effect of an energizing current supplied by each of the drivers 9–12.

When exciting a given core in the writing direction, the core is energized in the positive sense by three energizing currents. The remaining cores are energized in the positive sense by two energizing currents and in the negative sense by one energizing current, which latter current in this manner compensates one of the positive energizing currents. All of the cores are excited in the negative sense by the compensation current. In this manner the compensation current compensates the remaining energizing currents operating in the positive sense on all the cores not selected and compensates one of the energizing currents operating in the positive sense on the selected core. The selected core in this manner is set in the writing direction by two energizing currents, while none of the non-selected cores is set in the one or in the other direction.

When exciting a selected core in the reading direction, the core is energized in the negative sense by one energizing current and the remaining cores are energized in the positive sense by one energizing current. All the cores are also excited in the negative sense by the compensation current which in this manner compensates the energizing current operating in the positive sense on all the non-selected cores and enhances the effect of the energizing current operating on the selected core.

In both writing and reading instances two currents of equal strength cooperate in the selected core for supplying the load current, so that each of the two cooperating drivers, in this case transistors, need supply only half of the totally required power. The load sharing factor LS, by which is understood the number of currents of equal strength which contribute to the same load current, in this manner in the switch described is 2.

A magnetic core switch with 16 cores can be realized by means of the general development diagram shown in FIGURE 3*a*. In this general development diagram A indicates the winding diagram for $4^n$ cores and —A indicates the winding diagram which results from the winding diagram for $4^n$ cores by replacing therein all + signs by — signs and all — signs by + signs. For the case in which *n* equals 1, the winding diagram is formed for 16 cores, in which A indicates the winding diagram shown in FIGURE 2*a* and —A indicates the winding diagram derived therefrom by changing signs. By means of the elaborate winding diagram shown in FIGURE 3*b* for 16 cores and the general development diagram shown in FIGURE 3*a*, the winding diagram for 64 cores can be developed. By continuing this process, the winding diagrams on all magnet core switches with $4^n$ magnet cores can be developed. The number of energizing windings always equal $4^n$, while only one additional compensation winding is required on each magnet core. The intensity of the compensation current increases according as *n* increases but to a far lesser extent than the number of cores; as a matter of fact, the magnitude of the compensation current equals $2^{n-1}$ times an energizing current.

$4^n/2+2^{n-1}$ energizing current participate in the energizing of a core in the writing diection, of which $2^{n-1}$ energizing currents are compensated by the compensating current with a relative strength of $2^{n-1}$. In this manner $4^n/2$ energizing current contribute to the writing current in the load connected to the selected magnet core. $4^n/2-2^{n-1}$ energizing currents participate in the energization of a core in the reading direction, the magnetic effect of which is supported by the compensation current with a relative strength of $2^{n-1}$. In this manner the equivalent of $4^n/2$ energizing current contributes to the reading pulse. The total strength of the current I energizing a selected core either in the writing direction or in the reading direction consequently is the equivalent of $4^n/2$ energizing currents which factor is indicated by the load sharing factor LS and which is indicated in the table shown in FIGURE 4 for a number of values of *n*. The compensation current which is indicated in the table by IC is a factor $2^{n-1}$ times one energizing current, while the total energizing current I is a factor $4^n/2$ times one energizing current, so that the compensation current IC is a factor $2^n$ smaller than the total energizing current I. The factors $2^{n-1}$ and $½^n$ are indicated in the table of FIGURE 4 for a few values of *n*. This table illustrates that the compensation current, with the value of *n* increasing, decreases with respect to the totally required energizing current I. The load sharing factor is dependent upon the number of cores, so that the load sharing factor is entirely determined by a choice of the number of cores. However, in practice it appears that a sharing factor of 8 is already sufficient in many cases to supply the required power for the reading and writing current by means of the available transistors. When using a core switch with 64 cores, the strength of the compensation current is exactly ⅛ part of the total required energizing current, so that one transistor can exactly supply the required power for the compensation current.

Figure 5:
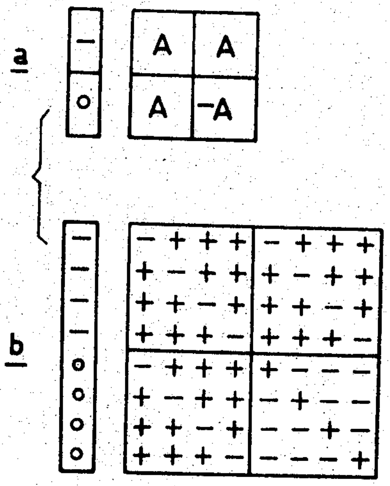

In the described manner core switches can be realized of which the number of cores is a power of 4; i.e. an even power of 2. Magnet core switches of which the number of cores is an odd power of 2 can be realized by means of the general development diagram shown in FIGURE 5*a*. In this diagram A indicates the winding diagram of a switch with $4^n$ cores and —A shows the winding diagram derived therefrom by sign exchange. In this manner, the winding diagrams of all the core switches with $2 \times 4^n$ magnet cores can be derived from the winding diagrams for $4^n$ cores. FIGURE 5*b* shows the winding diagram for 8 cores developed in this manner. The column shown beside the general development diagram of FIGURE 5*a* corresponds to the compensation winding, the 0 written in this column beside the lower part of the development diagram indicating that in the lower part corresponding thereto on the core switch no compensation winding is provided on the cores. In this lower part of the switch the number of energizing windings is exactly twice larger than the number of cores in this lower part, so that this part of the switch consequently corresponds to a known switch. By adding the upper part of the switch according to the invention, however, a switch is realized in which the total number of windings is only one larger than the number of cores. The compensation winding is provided only in the part of the switch which corresponds to the upper part of the development diagram in which two equal winding diagrams realized according to the invention for $4^n$ magnetic cores and placed beside each other. So in this part of the switch the compensation current must be twice as strong as in a switch with $4^n$ cores, so that the compensation current is a factor $2^n$ times as large as an energizing current. The writing and reading diagrams can be derived in quite an analogous manner as in FIGURE 2 from the winding diagrams shown in FIGURES 3 and 5, it being noted that in the switches which are realized according to the development diagram of FIGURE 5, the transistor connected to the compensation winding is driven during each excitation of a core.

What is claimed is:

1. A magnetic core switch assembly comprising a plurality of magnetic cores, a plurality of energizing coils on said cores in an amount equal to $N(2^{2n})$ where N is equal to 1 or 2 and $2n$ is the smallest even power of 2 which is equal to or larger than the number of said cores, said coils being coupled to each of said cores in a polarity pattern in which the number of coils having a given one magnetic polarity is equal to $$N\left(2^{\frac{2n}{2}}+2^{n-1}\right)$$

means for connecting the respective coils of said cores in series to form a plurality of series energizing circuits equal to the number of coils on each core, compensating windings coupled to each of said cores and connected in series to form a series compensating circuit, means for selectively energizing one of said cores in a given polarity direction comprising means for selectively supplying a first current of given intensity to the coils of said core having said given one magnetic polarity and for supplying to said compensating winding a second current at an intensity substantially equal of $N(2^{n-1})$ times said given current intensity, means for selectively energizing said given core at an opposite polarity comprising means for supplying to the complementary coils of said core said first current of given intensity and for supplying to said compensating winding the said second current intensity, and output means coupled to the said cores.

2. A magnetic core switch assembly as claimed in claim 1 wherein N has the value 2 and further comprising a plurality of cores in an amount equal to $2^{2n}$, a plurality of energizing coils on said cores in an amount equal to $2(2^{2n})$ and means connecting said coils in series to form a plurality of second series energizing circuits, and means for connecting said second series energizing circuits in series with said first-mentioned series circuits.

References Cited

UNITED STATES PATENTS 2,734,182 2/1956 Rajchman ---------- 340—166

BERNARD KONICK, *Primary Examiner.*

JAMES W. MOFFITT, *Examiner.*

R. MORGANSTERN, *Assistant Examiner.*